United States Patent [19]

Mizukami et al.

[11] Patent Number: 5,077,032

[45] Date of Patent: Dec. 31, 1991

[54] METHOD FOR CONTROLLING SPECIFIC SURFACE AREA OF ALUMINA

[75] Inventors: Fujio Mizukami; Kazuyuki Maeda; Shuichi Niwa; Makoto Toba, all of Ibaraki; Junichi Mine, Kanagawa, all of Japan

[73] Assignees: Agency of Industrial Science and Technology, Tokyo; Nissan Motor Company, Ltd., Yokohama, both of Japan

[21] Appl. No.: 420,070

[22] Filed: Oct. 11, 1989

[30] Foreign Application Priority Data

Oct. 11, 1988 [JP] Japan .................................. 63-253835

[51] Int. Cl.$^5$ ................................................ C01F 7/02
[52] U.S. Cl. ..................................... 423/628; 423/625; 423/629; 423/630
[58] Field of Search ............... 423/628, 629, 630, 625; 106/287.17, 287.19; 501/12

[56] References Cited

U.S. PATENT DOCUMENTS

| | | |
|---|---|---|
| 4,275,052 | 6/1981 | Ryu .................................... 423/630 |
| 4,387,085 | 6/1983 | Faneli et al. . |
| 4,649,037 | 3/1987 | Marsh et al. . |
| 4,713,233 | 12/1987 | Marsh et al. . |

FOREIGN PATENT DOCUMENTS

| | | |
|---|---|---|
| 706356 | 3/1965 | Canada .............................. 423/628 |
| 0197686 | 10/1986 | European Pat. Off. . |

Primary Examiner—Theodore Morris
Assistant Examiner—Edward Squillante
Attorney, Agent, or Firm—Pennie & Edmonds

[57] ABSTRACT

A process of production of alumina includes method for controlling specific surface area of alumina. Control of specific surface area is performed by controlling porous structure of alumina. In the process, aluminum alkoxide is subject hydrolysis for forming alumina sol. During hydrolysis process, polyether is used as organic solvent in order to control the porous structure of produced alumina.

10 Claims, 3 Drawing Sheets

METHOD FOR CONTROLLING SPECIFIC SURFACE AREA OF ALUMINA

BACKGROUND OF THE INVENTION

1. Field of the Invention

The present invention relates generally to a process of production of alumina which is useful as operational material, such as a support of catalyst or sensor and so forth, separation and purification agent, absorption agent, filter medium, filler of gel chromatography and so on. More specifically, the invention relates to a method for controlling the porous structure of alumina and for controlling the specific surface area thereof.

2. Description of the Background Art

As is well known, many of the properties of alumina are significantly variable depending upon specific surface area, when the alumina is used as operational material, separation and purification agent, absorption agent, filter medium, filler of gel chromatography and so on. Therefore, various attempts have been made for controlling the specific surface area of alumina, silica-alumina compositions, etc. in order to obtain desired properties.

As will be naturally appreciated, the specific surface area of alumina is variable depending upon particle size and the porous structure of the alumina particle. Therefore, the specific surface area of alumina can be controlled by controlling primary particle size and/or the number and diameter of voids on the alumina particle. In one approach, alumina particle size is controlled by the pH swing method proposed in "Catalyst Chemical Course (Shokubai Kagaku Koza) = Catalyst Design" published by Catalyst Academy, page 132. In the proposed process, aluminium salt is precipitate in a solution of a mixture of bemite A10(OH) and amorphous aluminium hydroxide. Then, pH is controlled up and down for smelting of amorphous aluminium hydroxide and growing bemite particles. In this method, the obtained alumina is often conterminated by alkaline pH adjusting agent. Furthermore, alumina obtained though such a precipitation process generally has substantially low heat resistance. In the typical case, after high temperature treatment, such as 1000° C. for three hours, the specific surface area will be reduced to be lower than or equal to 70 m$^2$/g. Such specific surface area is insufficient. Therefore, alumina produced through the precipitation process cannot be used as a support for a catalyst or sensor which may be subject to substantially high heat. In view of this, the precipitation process in production of alumina is applicable for only limited fields of use.

On the other hand, one of the typical methods for controlling the porous structure of alumina is to use organic compounds. Such methods have been proposed in "J. Catal." Vol. 1, 1962, pages 1, 547 through 563, and "Catalyst" Vol. 1, No. 3, 1978, page 144. In the proposed process, an organic component is solved in solution of aluminium salt to obtain precipitation of alumina or is added to alumina hydrate or dried gel. In general, polyehthylene glycol, polyvinyl alcohol, polyacryl amide, cellulose ether and so forth are used as the organic compounds. The size of void of alumina through the process set forth may range from 20 Å to 100,000 Å. Such wide range variation of the void size may make alumina useless in applications such as a filter medium, separation and purification agent, or absorption agent, which require substantially high selectivity. Similar processes have also been proposed in Japanese Patent First (unexamined) Publications (Tokkai) Showa 60-21802 and 61-68314. In the former Tokkai Showa 60-21802, there is proposed a process to precipitate alumina from alumine acid natrium solution in the presence of an organic halogen compound. In the later Tokkai Showa 61-68314, there is proposed a process of gelation of metallic alkoxide in the presence of dihydric alcohol or amino alcohol. In the former case, the void size can be made to range between 10 Å and 30 Å. However, an alkaline component will remain in the produced alumina causing a lowering of specific surface area at high temperature. On the other hand, in the later case, void size can be controlled to be less than or equal to 10 Å. However, in this case, void in the size range of 40 Å to 500 Å is also formed. Therefore, in the later case, it can be said that control of void size is not at all complete.

Another approach has been proposed in "Catalyst" Vol. 20, No. 2, 1978, pages 144 to 154. In this process, alumina hydrate is subject treatment by Monohydric alcohol or acid, and a limited specific surface area range, e.g. 197 m$^2$/g to 300 m$^2$/g or 199 m$^2$/g to 230 m$^2$/g is used. The alumina thus produced lacks heat resistance and can cause lack of specific surface area at high temperature range.

In order to improve the foregoing shortcomings in the background art in production of alumina, U.S. patent application Ser. No. 07/403,517, filed on Sept. 6, 1989 with a claim to priority on the basis of Japanese Patent Aplication No. 63-221448, filed on Sept. 6, 1988, which has been assigned of the common owners to the present invention, proposes a "PROCESS OF PRODUCTION OF ALUMINA WITH HIGH SPECIFIC SURFACE AREA".

SUMMARY OF THE INVENTION

In view of the background art set forth above, it is a principal object of the present invention to provide a method for controlling specific surface area while providing satisfactorily high heat resistance and maintaining satisfactorily high specific surface area even at a high temperature range.

In order to achieve the aforementioned and other objects, a process of production of alumina, according to the present invention, includes method for controlling the specific surface area of alumina. Control of specific surface area is performed by controlling the porous structure of alumina. In the process, aluminium alkoxide is subject hydrolysis and is used to form alumina sol. During hydrolysis process, polyether is used as organic solvent in order to control the porous structure of produced alumina.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment but are for explanation and understanding only.

In the drawings.

DETAILED DESCRIPTION OF THE INVENTION

Figure 1A:
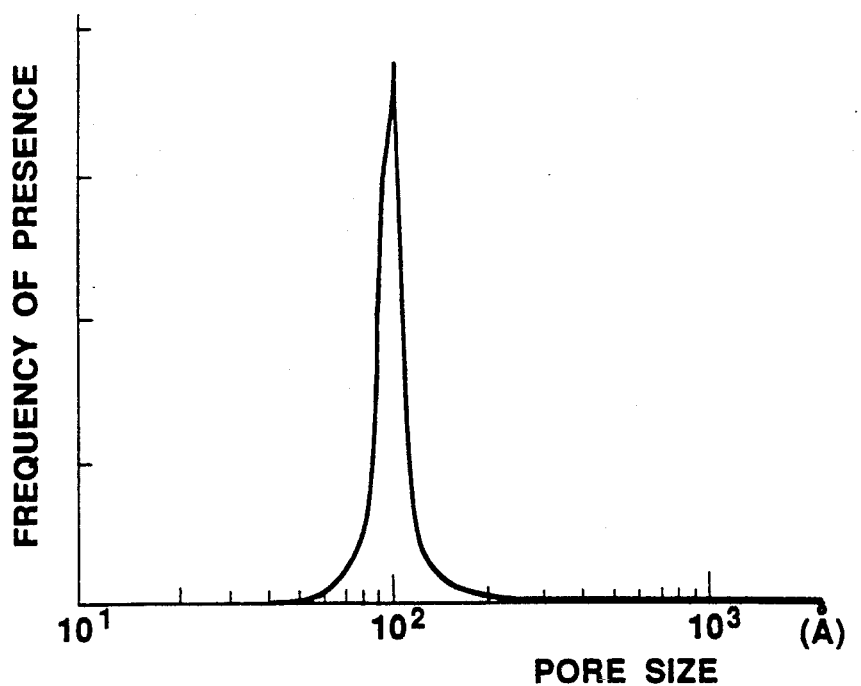
FIGS. 1(A), 1(B), 1(C), 1(D) and 1(E) respectively show pore distribution of examples 1(b), 2(c), 6(c) and 2(c)

As set forth above, the process of production of uniform pore distribution and high specific surface area alumina, according to the present invention includes a step of dissolving aluminium alkoxide in an organic solvent for causing reaction of the aluminium alkoxide with the organic composition for forming sol. Then, the sol is subject to a hydrolysis process for forming gel. The gel is then dried and baked for obtaining alumina as the final product. According to the present invention, polyethers are used as the organic solvent. The polyethers are found to be effective for controlling the porous structure of alumina.

Preferable, the polyether to be used as organic solvent can be expressed by the following formula:

$$R_1(OR_2)_l(OR_3)_m(OR_4)_nOR_5$$

wherein $R_1$ is alkyl group, $R_2$ to $R_4$ are alkylene group and $R_5$ is alkyl group or hydrogen, l is an integer starting from one (1), m and n are integer starting from zero (0) or one (1).

Reaction of aluminium alkoxide and polyether solvent for forming the solution is performed in a temperature range of between 10° C. and the boiling point of the polyether. The polyethers may include one (1) to twelve (12) carbons in the alkyl group and two (2) to sixteen (16) carbons in the alkylene group, and the sum of l, m and n is one (1) and six (6). Preferably, the polyethers include from one (1) to eight (8) carbons in the alkyl group and two (2) to twelve (12) carbons in the alkylene group, and the sum of l, m and n is between one (1) and four (4).

Baking of dried alumina gel is performed at a temperature in a range of 400° C. to 1200° C., and more preferably in a range of 600° C. to 1150° C.

Generally, aluminium ions may form tetracoordinated tetrahedrons and octacoordinated octahedrons. Alumina is a high molecular weight polymer created by covalent bonding of the polygons at the peak, edge or face via an oxygen or hydroxyl group. Accordingly, various structure and various molecular alumina can be produced depending upon kind and structure of hydroxide produced through hydrolysis process and progress of dehydrating condensation. Naturally, the specific surface area of alumina is variable depending upon the molecular structure thereof. Generally, higher specific surface area can be obtained with smaller molecular, structure in other words, smaller particles size of the primary particle. Also, tetrahedron structure provides higher specific surface area than an octahedron. However, when the particle size is too small, surface energy become excessive and the incidence of a non-bridged hydroxyl group is increased. This causes a high possibility of simple fusion or dehydrating fusion at high temperature thus causing a lowering of specific surface area. On the other hand, when an excess number of tetrahedron structured aluminium particles are present, the non-bridged coordinated water or hydroxyl group is increased for neutrization of electric charge. This also cause lowering of specific surface area. Therefore, in order to obtain alumina with high specific surface area at high temperature, a hydrolysis process and dehydrating polymerization process must be appropriately adjusted and controlled so as to obtain the appropriate molecular structure of primary particles of alumina.

In view of this, according to the invention, hydrolysis and condensation of aluminium alkoxide is controlled by polyethers for controlling particle size and structure and thus for controlling porous structure to control the specific surface area. Polyether as used in the present invention contains two or more oxygens which are capable of coordination with aluminium ions. Therefore, polyether can perform the reaction for forming complex or reaction for ligand conversion. In these reactions, unidentate ligand of aluminium ion will combine with a single oxygen or chelete coordination or form a bridging coordination with two or more oxygens. However, since the coordination bond between ether and oxygen is generally weaker than with the hydroxyl group, it can be easily replaced with a hydroxyl group when attached. This property is effective for performing hydrolysis and condensation. Therefore, by blocking and bridging the coordinating point, i.e. the peaks of the tetrahedron and octahedron, hydrolysis and dehydrating polymerization of aluminium alkoxide can be controlled. Thus, solution and gelation of aluminium alkoxide can be controlled. As a result, alumina with uniform quality and with high specific surface area at high temperature can be obtained.

Polyethers suitable for use in implementation of the present invention can be illustrated by the formula:

$$R_1(OR_2)_l(OR_3)_m(OR_4)_nOR_5$$

where $R_1$ to $R_5$ may include an unsaturated bond. However, it is preferable to exclude unsaturated bonds. Therefore, $R_1$ is an alkyl group, $R_2$ to $R_4$ are alkylene groups and $R_5$ is an alkyl group or a hydrogen, l is an integers starting from one (1), m and n are integer starting from zero (0) or one (1). When molecular weight becomes great, the polyethers are generally in the solid state and are thus cause difficult to use. For this reason, it is preferred that that alkyl group contains one to twelve (12) carbons and more preferably one to eight (8), and the alkylene group contains (2) to sixteen (16) carbons, and more preferably two to twelve (12) and sum of l, m and n is between one (1) and six (6), and more preferably, one (1) through four (4).

A polyether satisfying the foregoing conditions may be selected from the following: diethylene glycol monomethylether, diethylene glycol dimethylether, diethylene glycol monoethylether, diethylene glycol diethylether, diethylene glycol dibuthylether, tetraethylene glycol dimethylether, ethyl cellosolve, dodecandiol dimethylether, hexanediol dimethylether, hexanediol diethylether, diethylene glycol monobuthylether, dipropylene glycol dimethylether, diethylene glycol buthylmethgylether and so forth.

Preferably, 0.5 mol or more of polyether is used for every 1 mol of aluminum alkoxide in the present invention. Since the polyether forms a coordination bond with aluminium alkoxide, excess amounts of polyether may remain in the gel even after hydrolysis, thus making the baking process dangerous. Therefore, the upper limit for use of polyether is 5 mol, an preferably 3 mol. On the other hand, when the amount of polyether versus the amount of aluminium alkoxide is too small, difficulty may be caused in solving aluminium alkoxide to cause a delay of reaction. In such a case, another solvent may also be used in combination with polyether. Such an additional solvent may be selected among various solvents which can solve both aluminium alkoxide and polyether and which have a lower coordination bonding ability than polyether. For example, hydrocarbon halogenides, such as benzene or toluene, can be used as the additional solvent.

To implement the invention, it is possible to use any alkoxide irrespective of type of alkyl group to form aluminium alkoxide. Furthermore, material which is easily solved by polyethers such as aluminium methoxide, aluminium ethoxide, aluminium iso-propoxide, aluminium n-propoxide, aluminium n-butoxide, aluminium sec-butoxide, aluminium tert-butoxide and so forth may be used in view of cost and processing ability.

The temperature to solve the aluminium alkoxide in polyether is not substantially unlimited and can be used in a temperature range between the melting point and boiling point of polyether. However, if the temperature is too low, solving of aluminium alkoxide and complex formation with polyether becomes acceptablly slow. Therefore, preferred temperature range is 40° C. to 190° C.

The amount of water used in hydrolysis process is closely related to the amount of alumina particles to be produced and the specific surface area of alumina. When the amount of water used in the hydrolysis process is too small, the alumina gel after drying process may contain unacceptably large amounts of organic compounds to make it easy to cause fusion during high temperature baking process. On the other hand, excess amounts of water may create large molecular structures of alumina particles produced through solation and gelation process for reducing the specific surface area. Therefore, the amount of water to be used in the hydrolysis process is preferred to be in the range of 0.5 mol to 20 mol, for every 1 mol of aluminium alkoxide, and further, preferably in a range of 2 mol to 10 mol of water for every 1 mol of aluminium alkoxide. Water may be directly added, or, in the alternative added with diluting by appropriate solvent.

In the preferred process of the invention, the solution after adding the water is processed into gel form via sol form. It is possible to dry the obtained sol under reduced pressure in ordinary process. In the alternative, it may also be possible to put or impregnate the sol or undried gel to honeycomb support and subsequently dry under reduced pressure in ordinary way. Therefore, any method may be used for drying the obtained gel.

After drying the gel, baking is performed for obtaining a stronger structure of alumina. Furthermore, since the alumina gel obtained through the process of the present invention contains an organic compound such as polyether, such as organic component has to be completely burnt. Therefore, it is desirable to perform baking process at a temperature higher than that normally marketed. The preferred temperature of baking, in the preferred process is in a range of 400° C. to 1200° C., and more preferably in a range of 600° C. to 1150° C. It is possible to perform pre-heating before performing the baking process in an atmosphere of nitrogen, argon, helium and so forth. The pre-heating process may be particularly effective in view of prevention of explosion which may be caused by abrupt combustion of the organic component, when large amounts of alumina are to be baked.

EXAMPLES

In order to demonstrate advantages of the alumina production process with control of specific surface area according to the present invention, in comparision with the prior proposed processes, examples will be given herebelow.

EXAMPLE 1

0.59 mol of aluminium isopropoxide [$Al(O-iso-Pr)_3$] was put in a beaker of 500 ml capacity. To this, diethylene glycol dimethylether was added and subject to heating at a temperature of 120° C. with stirring for four hours in a hot water bath for forming a melt. After four hours, the bath temperature was lowered to 100° C. Subsequently, 90 g of water is added to the melt to form a solution. The solution then left over a night at the constant temperature (i.e. 100° C.) to obtain gel. The obtained gel was transferred to eggplant flask. In the flask, the obtained gel was subject to a drying process at a process temperature in the range of 100° C. to 170° C. under vacuum atmosphere. Through the drying process, 53 g of dries gel was obtained. The gel was subject to several stages of a baking process. The baking process was performed at 300° C. for one hour, 450° C., for one hour 600° C. for one hour and 800° C. for one hour. Through baking, white alumina powder was obtained. In addition, by performing further baking at 1020° C. for three hours, similar white alumina powder was obtained. For the later sample, pore distribution was measured by mercury pressurization. The result of this measurement is shown in FIG. 1A. As can be seen from FIG. 1A, the pore distribution of the sample exhibits a high concentration around 100 Å, having a peak at 100 Å. Also, the specific surface areas of former and later examples are shown in the appended table.

EXAMPLE 2

Figure 1B:
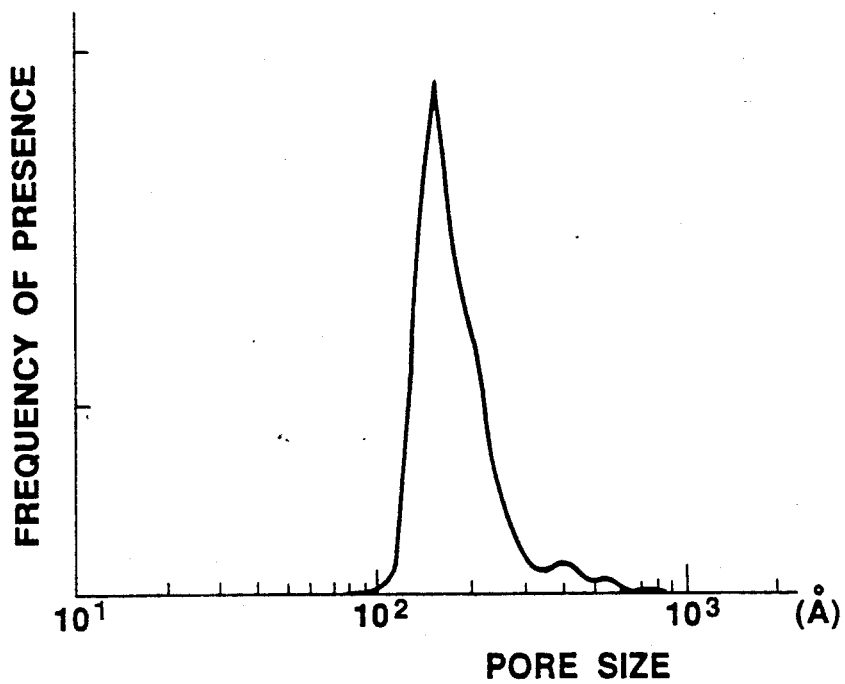
Figure 1C:
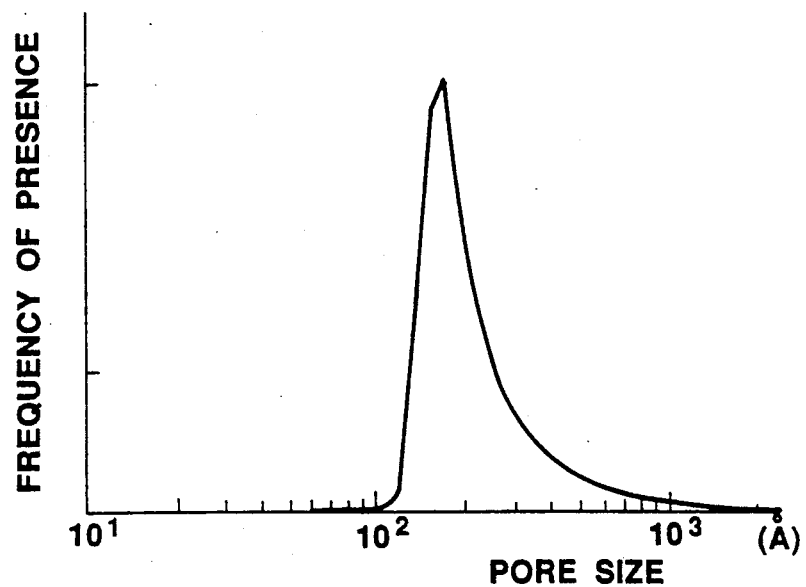
Figure 1D:
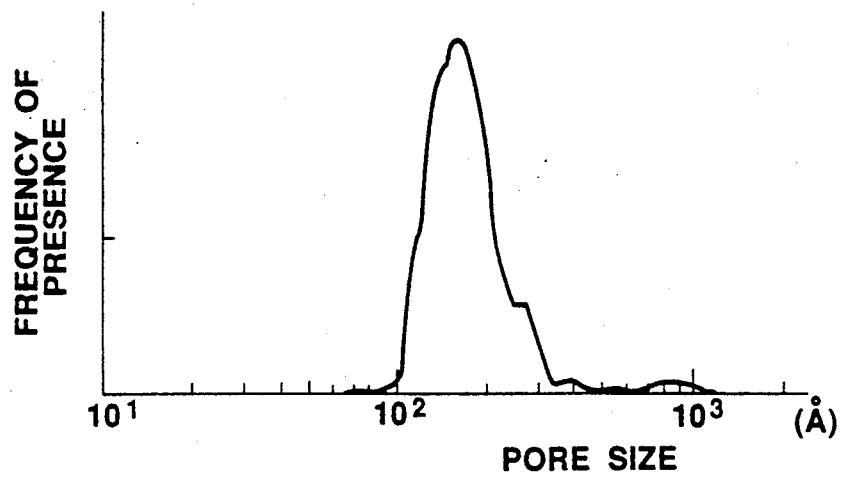

In place of diethylene glycol dimethylether of the foregoing example 1, triethylene glycol dimethylether was used. After adding water to the melt, the solution thus obtained was left at room temperature for two days. The remaining process performed are substantially the same as the example 1. At the final baking stage, sample (a) was obtained through baking at 600° C. for three hours, sample (b) was obtained through baking at 800° C. for three hours, and sample (c) was obtained through baking at temperature 1020° C. Pore distribution measured by mercury pressurization for the sample (c) is shown in FIG. 1D. In this case, a high concentration of pore distribution around 160 Å with sharp peak at 160 Å was observed. The specific surface areas of respective samples (a), (b) and (c) are shown in the appended table.

EXAMPLE 3

Figure 1E:
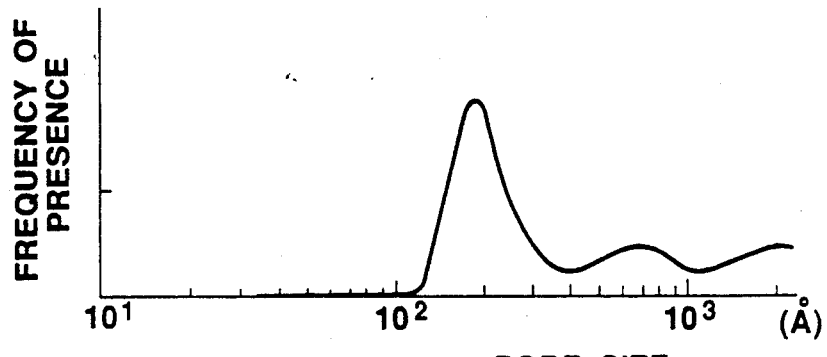

0.59 mol of aluminium isopropoxide was put in a beaker of 50 ml capacity. To this, 0.56 mol of tetraethylene glycol dimethylether was added. Then, the mixture was heated with stirring at a temperature of 120° C. in a hot water bath for four hours. The bath temperature was thereafter lowered to 90° C. Subsequently, 90 g of water was added to form a solution. The solution thus formed was left at room temperature for two days to obtain a gel. The obtained gel was transferred to an eggplant flask and dried therein at a temperature in the range of 130° C. to 170° C. Through the drying process, 76 g of dries gel was obtained. The gel was subject to several stages of a baking process. The baking process was performed at 300° C. for one hour, 450° C., for one hour 600° C., for one hour 800° C. for one hour and 1020° C. for one hour. Through baking, white alumina powder was obtained. For the later sample, pore distribution was measured by mercury pressurization. The result of measurement is shown in FIG. 1E. As can be seen from FIG. 1E, the pore distribution of the sample exhibits high concentration around 180 Å having a peak at 180 Å. Also, the specific surface areas of former and later examples are shown in the appended table.

EXAMPLE 4

In place of diethylene glycol dimethylether, diethylene glycol diethylether was used. The reaction was performed at 120° C. for five hours. Subsequent processes were performed as in example 1. At the final baking stage, sample (a) was obtained through baking at 600° C. for three hours, sample (b) was obtained through baking at 800° C. for three hours, and sample (c) was obtained through baking at 1020° C. Pore distribution measured by mercury pressurization for the sample (c) is shown in FIG. 1B. In this case, high concentration of pore distribution around 155 Å with sharp peak at 155 Å was observed. The specific surface areas of respective samples (a), (b) and (c) are shown in the appended table.

EXAMPLE 5

0.30 mol of aluminium isopropoxide was put in an eggplant flask of 300 ml capacity. To this, 0.32 mol of diethylene glycol di-n-buthylether was added. The mixture was heated with stirring at 80° C. for eight hours. For the melt, 50 g water was added to form a solution. Thereafter, the solution was left at 80° for one day to obtain a gel. The obtained gel was dried at 100° C. to 170° C. under vacuum atmosphere to obtain a dried gel. The dried gel was heated at 300° C. for one hour and subsequently, sample (a) was obtained through baking at temperature of 450° C. for three hours and 600° C. for three hours, sample (b) was obtained through further baking at 800° C. for three hours, and sample (c) was obtained through further baking at 1020° C. for three hours. The specific surface areas of respective samples (a), (b) and (c) are shown in the appended table.

EXAMPLE 6

Instead of performing the reaction at 80° C. for eight hours, the reaction was performed at 120° for four hours. Thereafter, the bath temperature was lowered to 100° C. Subsequently, the same operation as in example 5 was performed. At the final baking stage, sample (a) was obtained through baking at a temperature of 600° C. for three hours, sample (b) was obtained through baking at a temperature of 800° C. for three hours, and sample (c) was obtained through baking at temperature 1020° C. for three hours. Pore distribution measured by mercury pressurization for sample (c) is shown in FIG. 1C. In this case, a high concentration of pore distribution around 170 Å with sharp peak at 170 Å was observed. The specific surface areas of respective samples (a), (b) and (c) are shown in the appended table.

EXAMPLE 7

Instead of performing the reaction at 120° C. for four hours, reaction was performed at 150° for three hours. Subsequently, the same operation as in example 6 was performed. At the final baking stage, sample (a) was obtained through baking at 800° C. for four hours, and sample (b) was obtained through baking at 1020° C. for three hours. The specific surface areas of respective samples (a) and (b) are shown in the appended table.

EXAMPLE 8

0.58 mol of aluminium isopropoxide was put in a beaker of 500 ml capacity. To this, 1.0 mol of diethylene glycol monomethylether was added. Then, the mixture was heated with stirring at 80° C. in a hot water bath for six hours. Subsequently, 90 g of water was added to form a solution. The solution thus formed was left at a 80° C. for one day to obtain a gel. The obtained gel was transferred to an eggplant flask and dried therein at a temperature of between 100° C. and 170° C. Through the drying process, 44 g of dried gel was obtained. The gel was subject to several stages of a baking process. The baking process was performed at 300° C. for one hour, 450° C., 600° C. and 800° C. for respective three hours to obtain white alumina powder. In addition, further baking at 1020° C. for three hours was performed. The specific surface areas of former and later examples are shown in the appended table.

EXAMPLE 9

Instead of performing the reaction at 80° C. for six hours, the reaction was performed at 120° for four and half hours. Thereafter, the bath temperature was lowered to 100° C. Subsequently, the same operation to the example 5 was performed. At the final baking stage, sample (a) was obtained through baking at 600° C. for three hours, sample (b) was obtained through baking at 800° C. for three hours, sample (c) was obtained through baking at 1020° C. for three hours and sample (d) was obtained through baking at 1020° C. for forty-eight hours. The specific surface areas of respective samples (a), (b), (c) and (d) are shown in the appended table.

EXAMPLE 10

Instead of performing the reaction at 120° C. for four and one half hours, the reaction was performed at 170° for one and one half hours. Subsequently, the same operation as in example 6 was performed. At the final baking stage, sample (a) was obtained through baking at 800° C. for three hours, and sample (b) was obtained through baking at 1020° C. for three hours. The specific surface areas of respective samples (a) and (b) are shown in the appended table.

EXAMPLE 11

In place of diethylene glycol dimethylether, diethylene glycol monoethylether was used. The reaction was performed at 120° C. for six hours. Subsequent processes were performed through the as in example 1. At the final baking stage, sample (a) was obtained through baking at 800° C. for three hours, sample (b) was obtained through baking at 1020° C. for three hours. The specific surface areas of respective samples (a) and (b) are shown in the appended table.

EXAMPLE 12

Instead of performing reaction at 120° C. for six hours, reaction was performed at 170° C. for one and one half hours. Subsequently, the same operation as in example 1 was performed. At the final baking stage, sample (a) was obtained through baking at 800° C. for three hours, and sample (b) was obtained through baking at temperature of 1020° C. for three hours. The specific surface areas of respective samples (a) and (b) are shown in the appended table.

EXAMPLE 13

In place of diethylene glycol dimethylether, diethylene glycol mono-n-buthylether was used. The reaction was performed at 120° C. for five hours. Subsequent processes were performed through as in example 1. At the final baking stage, sample (a) was obtained through baking at 800° C. for three hours, sample (b) was obtained through baking at 1020° C. for three hours. The specific surface areas of respective samples (a) and (b) are shown in the appended table.

EXAMPLE 14

In place of diethylene glycol dimethylether, ethylene glycol monoethylether was used. The reaction was performed at 120° C. for six hours. Subsequent processes were performed as in example 1. At the final baking stage, sample was obtained through baking at 800° C. for three hours. The specific surface areas of respective samples (a) and (b) are shown in the appended table.

EXAMPLE 15

In place of diethylene glycol dimethylether, ethylene glycol dimethylether was used. The reaction was performed at 80° C. for one and one half hours and at 100° C. for two and one half hours. Subsequent processes were performed as in the example 1. At in final baking stage, sample (a) was obtained through baking at 800° C. for three hours, and sample (b) was obtained through baking at 1020° C. for three hours. The specific surface areas of respective samples (a) and (b) are shown in the appended table.

EXAMPLE 16

In place of diethylene glycol dimethylether, dipropylene glycol dimethylether was used. The reaction was performed at 120° C. for four hours. Subsequent processes were performed as in example 1. At the final baking stage, sample (a) was obtained through baking at 800° C. for three hours, sample (b) was obtained through baking at 1020° C. for three hours. The specific surface areas of respective samples (a) and (b) are shown in the appended table.

COMPARATIVE EXAMPLE 1

Figure 2:
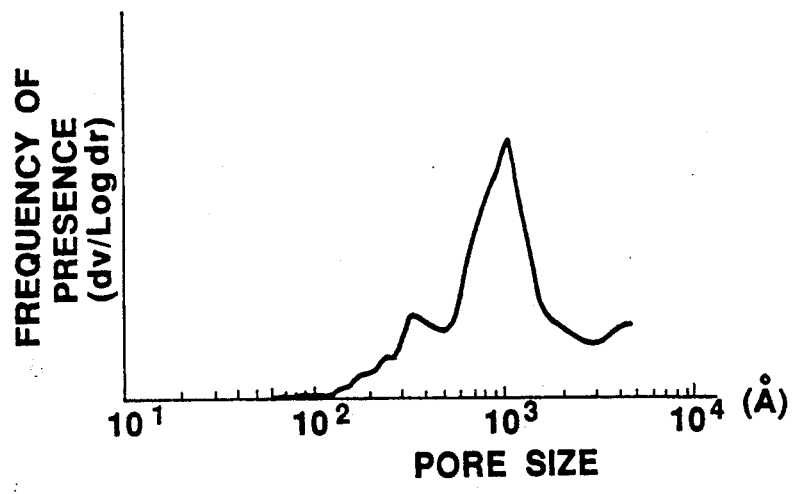
FIG. 2 shows pore distribution of the comparative example 1(b)

A Solution of 201 g of aluminium sulphate and 200 ml of water was formed. To this solution, an ammonia water diluted by 200 ml of water was added to obtain precipitate. After repeating decantation several times, the precipitate was washed. The washed precipitate was filtered and dried to obtain a dried gel. The dried gel was baked at 300° C. for one hour, 450° C., 600° C. and 800° C. respectively for three hours to obtain a sample (a). The resultant alumina was in white powder form. In addition, further baking at 1020° C. for three hours was performed for obtaining sample (b). Specific surface area of the samples (a) and (b) are shown in the appended table. Also, with respect to sample (b), pore distribution was measured by mercury pressurization. The result of this measurement is shown in FIG. 2.

COMPARATIVE EXAMPLE 2

To a solution containing 155.5 g of aluminium sulphate, a solution of alumine acid natrium was added until the pH reached seven (7). Precipitate was filtered. Precipitate was then washed until precipitate was not created by adding a solution of barium nitrate. The precipitate was then dried and subject to baking at 300° C. for one hour, 450° C., 600° C., 800° C. and 1020° C. respective for three hours. The specific surface area is shown in the appended table.

COMPARATIVE EXAMPLE 3

Figure 3:
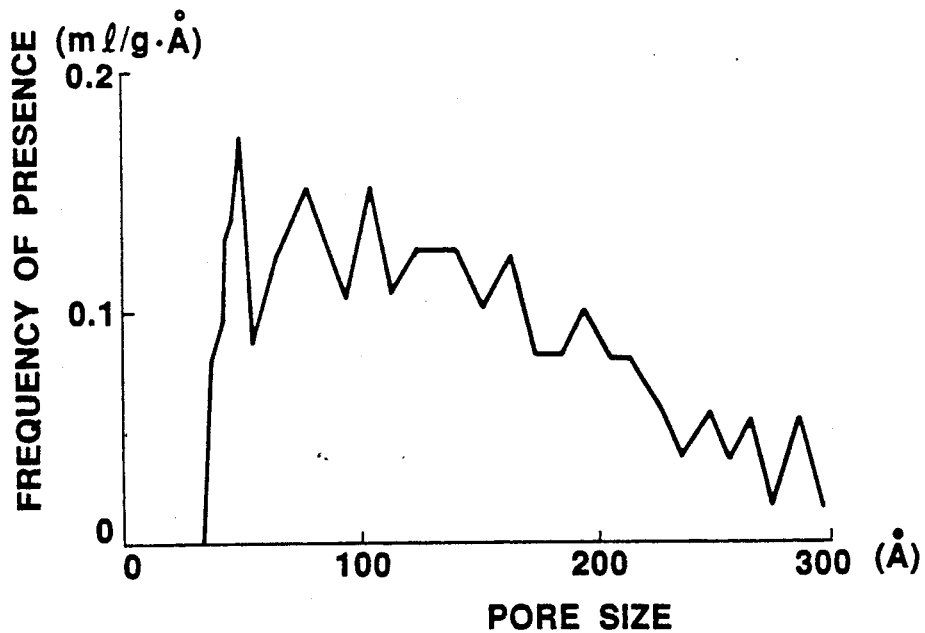
FIG. 3 shows a pore distribution of an alumina treated by adding Carbowax.

Pore distribution of alumina prepared by adding polyethylene glycol as shown in aforementioned "Catalyst" Vol. 20, No. 3, 1978, is shown in FIG. 3.

As will be appreciated, the examples implementing the present invention exhibit much higher uniformity of pore distribution and higher specific surface area. The excellent property of alumina produced by the process of the invention can be appreciated by comparing the pore distribution illustrated in FIG. 1 to FIG. 2. Furthermore, the alumina produced through the process according to the present invention can maintain satisfactorily high specific surface area even at high temperature.

Furthermore, since the process according to the invention may have sol state of alumina. Impregnation or putting of sol or undried gel can be easily done without requiring any additive.

Therefore, the present invention fulfills all of the objects and advantages sought therefor.

TABLE

| | | Kind of Polyether | Baking Condition Temp. (°C.) | Time (H) | Specific Surface Area ($m^2/g$) |
|---|---|---|---|---|---|
| Exam. | 1a | diethylene glycol dimethylether | 800 | 3 | 206 |
| | 1b | | 1020 | 3 | 151 |
| Exam. | 2a | triethylene glycol dimethylether | 600 | 3 | 304 |
| | 2b | | 800 | 3 | 187 |
| | 2c | | 1020 | 3 | 128 |
| Exam. | 3 | tetoraethylene glycol dimethylether | 1020 | 3 | 111 |
| Exam. | 4a | diethylene glycol diethylether | 600 | 3 | 369 |
| | 4b | | 800 | 4 | 184 |
| | 4c | | 1020 | 3 | 116 |
| Exam. | 5a | diethylene glycol di-n-buthylether | 600 | 3 | 366 |
| | 5b | | 800 | 4 | 208 |
| | 5c | | 1020 | 3 | 131 |
| Exam. | 6a | diethylene glycol di-n-buthylether | 600 | 3 | 323 |
| | 6b | | 800 | 4 | 208 |
| | 6c | | 1020 | 3 | 102 |
| Exam. | 7a | diethylene glycol di-n-buthylether | 800 | 4 | 165 |
| | 7b | | 1020 | 3 | 102 |

TABLE-continued

|  |  | Kind of Polyether | Baking Condition Temp. (°C.) | Time (H) | Specific Surface Area (m²/g) |
|---|---|---|---|---|---|
| Exam. | 8a | diethylene glycol monomethylether | 800 | 3 | 227 |
|  | 8b |  | 1020 | 3 | 126 |
| Exam. | 9a | diethylene glycol monomethylether | 600 | 3 | 343 |
|  | 9b |  | 800 | 3 | 229 |
|  | 9c |  | 1020 | 3 | 133 |
|  | 9d |  | 1020 | 48 | 87 |
| Exam. | 10a | diethylene glycol monomethylether | 800 | 3 | 234 |
|  | 10b |  | 1020 | 3 | 132 |
| Exam. | 11a | diethylene glycol monoethylether | 800 | 3 | 252 |
|  | 11b |  | 1020 | 3 | 142 |
| Exam. | 12a | diethylene glycol mono-n-buthylether | 800 | 3 | 230 |
|  | 12b |  | 1020 | 3 | 140 |
| Exam. | 13a | diethylene glycol mono-n-buthylether | 800 | 3 | 248 |
|  | 13b |  | 1020 | 3 | 142 |
| Exam. | 14 | ethylene glycol monethylether | 800 | 3 | 195 |
| Exam. | 15a | ethylene glycol dimethylether | 800 | 3 | 190 |
|  | 15b |  | 1020 | 3 | 116 |
| Exam. | 16a | dipropylene glycol dimethylether | 800 | 3 | 213 |
|  | 16b |  | 1020 | 3 | 134 |
| Comp. | 1a | ammonia precipitation of aluminium sulphate | 800 | 3 | 77 |
|  | 1b |  | 1020 | 3 | 21 |
| Comp. | 2 | mixing of aluminium sulphate and alumine acid natrium | 1020 | 3 | 63 |

What is claimed is:

1. A process for forming alumina comprising the steps of:
    dissolving aluminum alkoxide in a polyether organic solvent to form sol;
    forming a gel by hydrolyzing said sol;
    drying the obtained gel and baking the dried gel in order to obtain alumina.

2. A process as set forth in claim 1, wherein said polyether to be used as said organic solvent is expressed by the following formula:

$$R_1(OR_2)_l(OR_3)_m(OR_4)_nOR_5$$

wherein $R_1$ is an alkyl group, $R_2$ to $R_4$ are alkylene groups and $R_5$ is either an alkyl group or a hydrogen, where l is a positive integer, and m is zero or a positive integer and n is zero or a positive integer.

3. A process set forth in claim 2, wherein reaction of said aluminium alkoxide and the polyether solvent to form said sol is performed in a temperature range of between 10° C. and the boiling point of the polyether.

4. A process set forth in claim 3, wherein the preferred reaction temperature is between 40° C. and 190° C.

5. A process set forth in claim 2, wherein said polyether includes from one to twelve carbons in said alkyl group and from two to sixteen carbons in said alkylene group, and wherein the algebraic sum of l, m and n is an integer between zero and seven.

6. A process as set forth in claim 5, wherein said polyether includes from one to eight carbons in said alkyl group and from two to twelve carbons in said alkylene group, and the algebraic sum of l, m and n is between zero and five.

7. A process as set forth in claim 1, wherein said baking of said dried alumina gel is performed at a temperature of between 400° C. and 1200° C.

8. A process as set forth in claim 7, wherein said baking of said dried alumina gel is performed at a temperature of between 600° C. and 1150° C.

9. A process as set forth in claim 6, wherein said polyether is selected from the group consisting essentially of:
    diethylene glycol monomethylether, diethylene glycol dimethylether, diethylene glycol monoethylether, diethylene glycol dimethylether, ethyl cellosolve, dedecandiol dimethylether, hexanediol dimethylether, hexanediol diethylether, diethylene glycol monobuthylether, dipropylene glycol dimethylether, and diethylene glycol buthylemthgylether.

10. A process set forth in claim 1, wherein said aluminium alkoxide is selected from the group consisting essentially of:
    aluminium methoxide, aluminium ethoxide, aluminium isopropoxide, aluminium n-propoxide, aluminium n-butoxide, aluminium see-butoxide, and aluminium tert-butoxide.

* * * * *